(12) United States Patent
Krueger et al.

(10) Patent No.: US 12,505,550 B2
(45) Date of Patent: Dec. 23, 2025

(54) RAPID SPECIES IDENTIFICATION VIA POPULATION TOPOGRAPHY

(71) Applicant: Georgia Tech Research Corporation, Atlanta, GA (US)

(72) Inventors: Adam Krueger, Atlanta, GA (US); Peter Yunker, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/183,629

(22) Filed: Apr. 18, 2025

(65) Prior Publication Data
US 2025/0329014 A1 Oct. 23, 2025

Related U.S. Application Data

(60) Provisional application No. 63/636,376, filed on Apr. 19, 2024.

(51) Int. Cl.
*G06T 7/00* (2017.01)
*G01N 21/45* (2006.01)
(Continued)

(52) U.S. Cl.
CPC .......... *G06T 7/0012* (2013.01); *G01N 21/45* (2013.01); *G06V 10/82* (2022.01); *G06V 20/698* (2022.01); *G16H 50/20* (2018.01); *G06V 2201/03* (2022.01)

(58) Field of Classification Search
CPC .......... A61B 5/0059; A61B 2562/0238; A61B 1/000096; A61B 10/02; G06T 7/0012;
(Continued)

(56) References Cited

U.S. PATENT DOCUMENTS 9,891,418 B2 * 2/2018 Spizig ................. G02B 21/006
2019/0355113 A1 * 11/2019 Wirch ....................... G06T 7/32
(Continued)

FOREIGN PATENT DOCUMENTS

WO   WO2000006980 A1 *  2/2000
WO      2020018186 A1     1/2020

OTHER PUBLICATIONS

Rey-Barroso, L.; Peña-Gutiérrez, S.; Yáñez, C.; Burgos-Fernández, F.J.; Vilaseca, M.; Royo, S. Optical Technologies for the Improvement of Skin Cancer Diagnosis: A Review. Sensors 2021, 21, 252. https://doi.org/10.3390/s21010252 (Year: 2021).*

(Continued)

*Primary Examiner* — Courtney Joan Nelson
(74) *Attorney, Agent, or Firm* — TROUTMAN PEPPER LOCKE LLP; Ryan A. Schneider; Stephanie J. Remy

(57) ABSTRACT

An exemplary embodiment of the present disclosure provides a method of identifying one or more components in a biological material, the method comprising: providing a biological specimen, the biological specimen comprising one or more components; imaging at least a portion of the biological specimen to generate data indicative of a topography of the at least a portion of the biological specimen; and determining, using a machine learning algorithm, based at least in part on the data indicative of a topography of the at least a portion of the biological specimen, an identity of the one or more components of the biological specimen.

19 Claims, 4 Drawing Sheets

(51) Int. Cl.
  *G06V 10/82* (2022.01)
  *G06V 20/69* (2022.01)
  *G16H 50/20* (2018.01)
(58) Field of Classification Search
  CPC . G06T 2207/20081; G06T 2207/30004; G06T 2207/10061; G16H 30/40; G16H 50/20; G06N 3/08; G06V 10/25; G06V 2201/03; G06V 20/698; G06V 10/82; G01N 21/45
  See application file for complete search history.

(56) References Cited

U.S. PATENT DOCUMENTS

| | | |
|---|---|---|
| 2021/0073984 A1* | 3/2021 | Locke .................. G06T 7/0012 |
| 2022/0282299 A1 | 9/2022 | Weiss et al. |
| 2023/0076868 A1 | 3/2023 | Olender et al. |

OTHER PUBLICATIONS

Bravo et al., "Vertical growth dynamics of biofilms." Proceedings of the National Academy of Science. Mar. 7, 2023, vol. 120, No. 11, p. 1-10 (10 pages).
International Search Report and Written Opinion in International Patent Application No. PCT/US2025/025372 mailed Jun. 25, 2025 (15 pages).

\* cited by examiner

RAPID SPECIES IDENTIFICATION VIA POPULATION TOPOGRAPHY

CROSS-REFERENCE TO RELATED APPLICATIONS

This application claims the benefit of U.S. Provisional Application Ser. No. 63/636,376, filed on 19 Apr. 2024, which is incorporated herein by reference in its entirety as if fully set forth below.

STATEMENT OF RIGHTS UNDER FEDERALLY SPONSORED RESEARCH

This invention was made with government support under GM138354 awarded by the National Institutes of Health. The government has certain rights in the invention.

FIELD OF THE DISCLOSURE

The various embodiments of the present disclosure relate generally to systems and methods for identifying species of bacteria.

BACKGROUND

The identification of pathogens, including bacteria, fungi, and parasites, is a critical step in diagnosing infections and determining appropriate treatment strategies. Accurate and timely identification is essential for effective patient care, particularly when antibiotic susceptibility tests are performed. The U.S. Food and Drug Administration (FDA) mandates that bacterial species be identified as part of these tests to ensure the correct antibiotic is prescribed.

Currently, the gold standard for bacterial species identification is Matrix-Assisted Laser Desorption/Ionization-Time of Flight (MALDI-TOF) mass spectrometry. This technique is highly effective and widely used in clinical laboratories. However, it has significant drawbacks that limit its accessibility and efficiency.

Firstly, MALDI-TOF mass spectrometry requires a sufficient amount of bacterial culture to be grown before analysis. This cultivation step can be time-consuming, delaying the identification process. Once the bacteria are cultured, the sample is placed in the MALDI-TOF device for a measurement that typically takes around 30 minutes. While the measurement time itself is relatively short, the overall process, including the cultivation period, can be lengthy.

The second, and most significant, limitation of MALDI-TOF mass spectrometry is its cost. The mass spectrometry devices are expensive, making them a substantial investment for clinical laboratories. The high cost of these devices can be a barrier to their widespread adoption, particularly in resource-limited settings.

Given these limitations, there is a clear need for new methods of pathogen identification that are both faster and more cost-effective. An improved approach would reduce the time required for species identification and lower the financial burden on healthcare facilities. This would enhance the ability to quickly and accurately diagnose infections, leading to better patient outcomes and more efficient use of healthcare resources.

The present disclosure addresses these needs by providing a novel method for identifying pathogens that is significantly cheaper and faster than conventional techniques, such as MALDI-TOF mass spectrometry. This innovative approach promises to revolutionize the field of pathogen identification, making it more accessible and efficient for clinical laboratories worldwide.

BRIEF SUMMARY

An exemplary embodiment of the present disclosure provides a method of identifying one or more pathogens in a biological material, the method comprising: providing a biological specimen; imaging at least a portion of the biological specimen to generate data indicative of a topography of the at least a portion of the biological specimen; and determining, using a computer-implemented computational algorithm, based at least in part on the data indicative of a topography of the at least a portion of the biological specimen, whether one or more pathogens are present in the at least a portion of the biological specimen and, if so, an identity of the one or more pathogens.

In any of the embodiments disclosed herein, the biological specimen can be selected from the group consisting of: blood, urine, cerebrospinal fluid, saliva, sputum, synovial fluid, pleural fluid, peritoneal fluid, amniotic fluid, semen, vaginal secretions, nasal swabs, throat swabs, tissue biopsies, and stool samples.

In any of the embodiments disclosed herein, the pathogen can be selected from the group consisting of: bacteria, fungi, parasites, viruses, and combinations thereof.

In any of the embodiments disclosed herein, imaging at least a portion of the biological specimen can comprise performing profilometry.

In any of the embodiments disclosed herein, performing profilometry can comprise performing interferometry.

In any of the embodiments disclosed herein, performing interferometry can comprise performing white light interferometry.

In any of the embodiments disclosed herein, performing the white light interferometry can comprise performing coherence scanning interferometry.

In any of the embodiments disclosed herein, performing interferometry can comprise performing phase shifting interferometry.

In any of the embodiments disclosed herein, determining the identity of the one or more components of the biological specimen can comprise: standardizing the data indicative of a topography of the specimen; determining, with the standardized data, one or more biophysically relevant features; inputting the one or more biophysically relevant features into a classifier; and determining, with the classifier, the identity of the one or more components of the biological specimen.

In any of the embodiments disclosed herein, standardizing the data indicative of a topography of the specimen can comprise: fitting an equation on one of at least a portion of a topography of a substrate on which the biological specimen is inoculated and a topography of the biological specimen; and subtracting a surface defined by at least a portion of terms of the fitted equation from an entire topographic map indicated by the data.

In any of the embodiments disclosed herein, the equation can be a polynomial equation.

In any of the embodiments disclosed herein, the equation can be a Fourier series.

In any of the embodiments disclosed herein, the data indicative of a topography of the at least a portion of the biological specimen can be indicative of a homeland and/or a coffee ring, and the biophysically relevant features can comprise one or more selected from the group consisting of:

median height of the homeland; a variance in height in the homeland; a coefficient of variation of the heights in the homeland; a median height of the coffee ring; a variance of the heights in the coffee ring; a coefficient of variation of the heights in the coffee ring; a width of the coffee ring; a saturation width of the coffee ring; a Hurst exponent of the coffee ring; a ratio of the median height in the coffee ring to the median height in the homeland; a product of a median height in the coffee ring and a median height in the homeland; and an average Fast Fourier Transform amplitude for different wavelengths.

In any of the embodiments disclosed herein, the computer-implemented computational algorithm can comprise one or more machine learning algorithms selected from the group consisting of: an unsupervised K-means clustering method; a support vector machines method; and a random forest classifier method.

In any of the embodiments disclosed herein, the computer-implemented computational algorithm can comprise a convolutional neural network.

In any of the embodiments disclosed herein, the data indicative of a topography of the biological specimen can comprise a two-dimensional array of height data.

In any of the embodiments disclosed herein, the height data can correspond to an absolute height with respect to a reference height.

In any of the embodiments disclosed herein, the method can further comprise culturing the biological specimen.

In any of the embodiments disclosed herein, the method can further comprise inoculating the biological specimen.

In any of the embodiments disclosed herein, the method can further comprise preprocessing the biological specimen, and preprocessing can include one or more processes selected from the group consisting of: filtering the biological specimen, centrifuging the biological specimen, introducing chemical or biological additives to the biological specimen, or mechanically separating the biological specimen.

In any of the embodiments disclosed herein, the method can further comprise incubating the biological specimen.

In any of the embodiments disclosed herein, the biological specimen can be inoculated on a substrate.

In any of the embodiments disclosed herein, the substrate can be an agar pad with differential, selective, and/or growth media.

In any of the embodiments disclosed herein, the method can further comprise incubating the inoculated biological specimen.

In any of the embodiments disclosed herein, the method can further comprise generating an output indicative of the presence and/or identity of the one or more pathogens.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
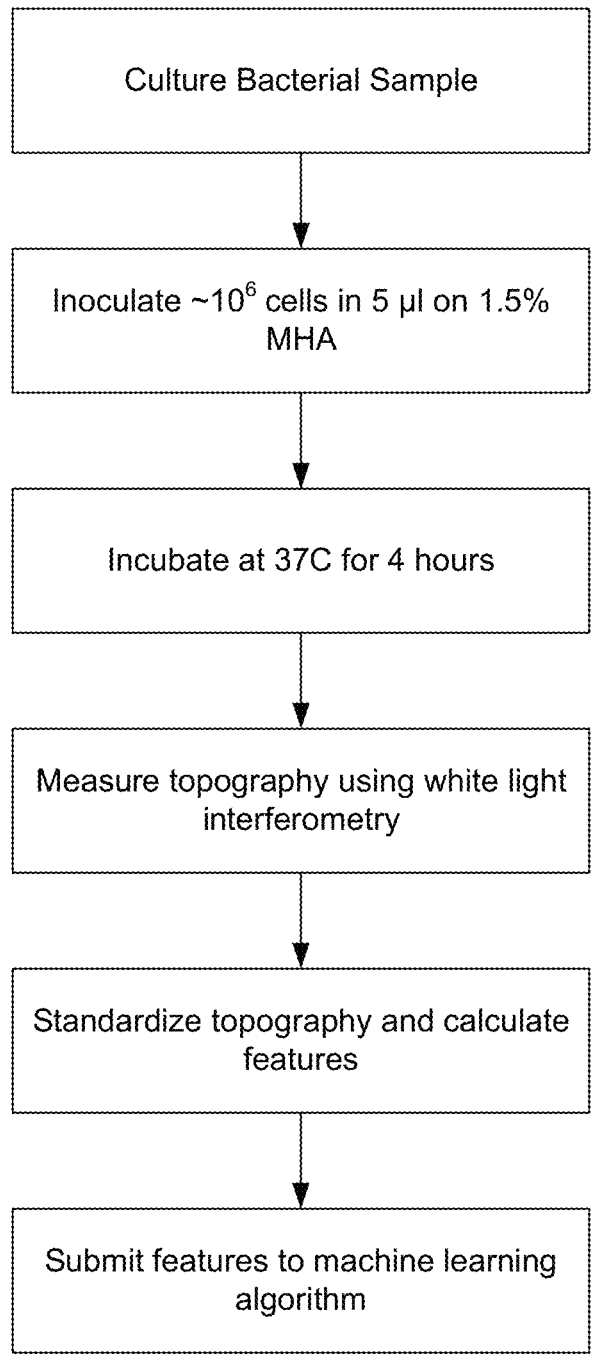
FIG. 1 provides flow chart of a method of identifying one or more components in a biological material, in accordance with some embodiments of the present disclosure.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

By "comprising" or "containing" or "including" is meant that at least the named compound, member, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The materials described as making up the various members of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Embodiments of the present disclosure can address disadvantages with many conventional technologies by providing novel methods for identifying pathogens that are significantly cheaper and faster than conventional techniques, such as MALDI-TOF mass spectrometry. This innovative approach involves the use of advanced imaging techniques, such as white light interferometry or, mor particularly, coherence scanning interferometry, to obtain a topographical map data set of a biological sample. The topographical map provides detailed information about the surface characteristics of the sample, which can be indicative of the presence of specific pathogens. To interpret the topographical map data set and classify the sample, embodiments of the present disclosure can employ a computer-implemented computational algorithm. In some embodiments, the computer-implemented computational algorithm comprises a machine learning algorithm trained on a large dataset of known pathogen topographies, enabling it to accurately identify and classify the pathogens present in the sample. This method not only speeds up the identification process but also significantly reduces the cost associated with pathogen identification.

An exemplary embodiment of the present disclosure provides a method of determining the presence of and identifying one or more pathogens in a biological specimen. As used herein, the term "pathogen" includes any microorganism that can cause disease in a host organism, including, but not limited to, bacteria, viruses, fungi, parasites, and the like. The method can comprise obtaining data indicative of a topography of at least a portion of the biological specimen. As discussed in more detail below, in some embodiments, the data can be obtained by imaging the biological specimen. Once the topographical data is obtained, the method can further comprise determining, based at least in part on the topographical data, the presence and identity of one or more pathogens in the biological specimen. For example, the method can determine whether any pathogens are present in the specimen, and if so, a family, genus, and/or species of the pathogen. As discussed in more detail below, this determination can be made using one or more computer-implemented computational algorithms.

The biological specimen can be many biological specimens known in the art, including, but not limited to, blood, urine, cerebrospinal fluid, saliva, sputum, synovial fluid, pleural fluid, peritoneal fluid, amniotic fluid, semen, vaginal secretions, nasal swabs, throat swabs, tissue biopsies, and stool samples, and the like. In some embodiments, prior to obtaining the data set or imaging the specimen, the method can further comprise culturing the biological specimen. The culturing can occur via many means known in the art. In some embodiments, however, culturing is not required. Further, in some embodiments, the identification process can be successful with minimal or no culturing of the specimen.

After culturing, in some embodiments, the method can further comprise inoculating the specimen. For example, in some embodiments, the specimen can be inoculated on a substrate (e.g., a planar or non-planar substrate). The substrate can be many substrates known in the art, including, but not limited to Agar pads/plates (e.g., MH agar pads) and the like. In some embodiments, the agar pards can include differential, selective, and/or growth media. Further, in some embodiments, the specimen can be inoculated on multiple different types of substrates, and the imaging and determining steps can be performed on the specimen on each substrate. In some embodiments, the specimen can further undergo a preprocessing step, which can include, but is not limited to, filtration, centrifugation, chemical or biological additives, mechanical separation, and the like. In some embodiments, after inoculation, the method can further comprise incubation of the inoculated sample for a predetermined period of time.

The data indicative of a topography of at least a portion of the biological specimen can be obtained many different ways. In some embodiments, the data can be obtained through profilometry. As used herein, the term "profilometry" includes any measurement technique used to determine the surface profile, or topography, of an object. The term can encompass both contact and contact-less profilometry. In some embodiments, profilometry can involve imaging the specimen via laser scanning or interferometry.

In some embodiments, white light interferometry (WLI) is employed to generate the topographical data. As used herein, the term "white light interferometry" generally includes non-contact optical measurement techniques utilized for the precise determination of surface topography. WLI typically employs a broadband light source, encompassing a wide spectrum of wavelengths, to illuminate the surface under examination. The light reflected from the surface interferes with a reference beam, producing an interference pattern. This pattern is captured and analyzed to reconstruct a detailed three-dimensional map of the surface.

One form of WLI that can also be utilized in accordance with various embodiments of the present disclosure is coherence scanning interferometry (CSI). As used herein, "coherence scanning interferometry" generally refers to high-precision, non-contact optical measurement techniques used to determine surface topography and roughness. This method typically utilizes a broadband light source to illuminate the surface under examination. The light reflected from the surface interferes with a reference beam, and the resulting interference pattern is analyzed as the optical path length is varied. By scanning the surface and measuring the coherence of the light at different depths, CSI can construct a detailed three-dimensional map of the surface with nanometer-scale precision.

In some embodiments, phase shifting interferometry (PSI) is employed to generate the topographical data. As used herein, "phase shifting interferometry" generally refers to optical measurement techniques utilized to generate high-resolution topographical data about a biological specimen. This method can include the creation of interference patterns by superimposing a reference light beam with a beam reflected from the specimen. The phase of the reference beam can be systematically shifted in precise increments, and multiple interference patterns can be recorded. These patterns can then be analyzed to extract phase information, which is used to reconstruct the surface profile or other characteristics of the specimen with nanometer or sub-nanometer precision. PSI is non-contact and non-destructive, making it suitable for delicate biological specimens.

The data indicative of the topography of the specimen can take many forms in accordance with various embodiments of the present disclosure. In some embodiments, the data can comprise a two-dimensional array of height data. The height data can correspond to an absolute height with respect to a reference height.

As discussed above, once the data indicative of the topography is obtained, the data can be processed using a computer-implemented computational algorithm to determine whether a pathogen is present in the specimen and, if so, to further identify the pathogen (e.g., identification of a family, genus, and/or species of the pathogen). As used herein, the term "computer-implemented computational algorithm" refers to any sequence of instructions or set of rules executed by a computer or computing device to process data, perform calculations, or solve problems. This broad definition encompasses various types of algorithms, including but not limited to, traditional algorithms, machine learning algorithms, neural networks (including convolutional neural networks), and any other algorithmic approaches or computational techniques that can be implemented on a computer to analyze data, including statistical methods, optimization algorithms, and heuristic methods.

In some embodiments, the method employs a one or more machine learning. The term "machine learning algorithms" refers to any algorithm that enables a computer to learn from and make predictions or decisions based on data, including, but not limited to, supervised learning, unsupervised learning, reinforcement learning, and other paradigms. Exemplary machine learning algorithms can include unsupervised learning algorithms, supervised learning algorithms, and reinforcement learning algorithms. Supervised learning algorithms include, but are not limited to, K-means Clustering, Hierarchical Clustering, Principal Component Analysis (PCA), and the like. Unsupervised learning algorithms include, but are not limited to, Support Vector Machines (SVM), Random Forest Classifiers, Linear Regressions, Logistic Regressions, Naive Bayes Classifiers, K-Nearest Neighbors (KNN), Gradient Boosting Machines (GBM), Neural Networks, and the like. Reinforcement learning algorithms include, but are not limited to, Q-Learning, Deep Q-Learning (DQN), Policy Gradient Methods, and the like.

In some embodiments, the machine learning algorithm comprises a neural network. The term "neural networks" refers to computational models inspired by the human brain, comprising interconnected nodes (neurons) that process data in layers, including, but not limited to, convolutional neural networks (CNNs), recurrent neural networks (RNNs), and deep learning models. The term "convolutional neural networks" refers to a class of deep neural networks particularly well-suited for analyzing visual data, which use convolutional layers to automatically and adaptively learn spatial hierarchies of features from input data.

In some embodiments, multiple computer-implemented computational algorithms can be employed. For example, as explained in the Examples section below, in some embodiments, the method can each of an unsupervised K-means clustering method, a support vector machines method, and a random forest classifier method.

The computer-implemented algorithms utilized by embodiments of the present disclosure can determine the presence and/or identify of pathogens in the specimen through various steps. In some embodiments, the method can comprise standardizing the data indicative of a topography of the specimen; determining, with the standardized data, one or more biophysically relevant features; inputting the one or more biophysically relevant features into a classifier; and determining, with the classifier, the identity of the one or more components of the biological specimen.

In some embodiments, standardizing the data indicative of a topography of the specimen can comprise: fitting a polynomial equation to the topography of a substrate on which the biological specimen is inoculated; and subtracting a surface defined by the polynomial equation from the entire topographic map indicated by the data. The polynomial equation can be a first degree (e.g., representing a plane) or higher degree polynomial equation.

In any of the embodiments disclosed herein, the topographical data can be indicative of a homeland and/or a coffee ring, which is further explained in the Examples section below. In such embodiments, biophysically relevant features utilized to determine and identify pathogens can comprise one or more selected from the group consisting of: median height of the homeland; a variance in height in the homeland; a coefficient of variation of the heights in the homeland; a median height of the coffee ring; a variance of the heights in the coffee ring; a coefficient of variation of the heights in the coffee ring; a width of the coffee ring; a saturation width of the coffee ring; a Hurst exponent of the coffee ring; a ratio of the median height in the coffee ring to the median height in the homeland; a product of a median height in the coffee ring and a median height in the homeland; and an average Fast Fourier Transform amplitude for different wavelengths.

Once a determination has been made as to whether one or more pathogens are present in a specimen and/or an identify of such pathogens, in some embodiments, the method can further comprise generating an output indicative of the presence and/or identity of the pathogen(s). For example, in some embodiments, a processor (e.g., the processor performing the computer-implemented computational algorithm) can generate an output signal to send a notification to an end user as to the presence and/or identification of the pathogen(s). In some embodiments, the output signal can cause a display to indicate whether the pathogen is present in the sample and if so its identify (e.g., family, genus, and/or species). In some embodiments, the output can generate an electronic message to be delivered to a remote location.

EXAMPLE

Below an exemplary implementation of a method of identifying one or more components in a biological material is explained. This example is provided for illustrative purposes only and should not be construed as limiting the scope of the present disclosure or the claims appended hereto.

At a high level, bacteria was grown on agar for 4 hours, and then the topography of the entire population, or part of the population, was measured via interferometry. A classifier developed using machine learning was then used to determine the species of the bacteria.

Some useful acronyms for understanding this example include: (1) MH: Mueller-Hinton (usually in the form of solid agar by adding agarose for these purposes); and (2) TZP—piptazo antibiotic (piperacillin Tazobactam)—considered at the breakpoint 16/4 ug/ml.

FIG. 1 provides a flow chart describing an exemplary method of identifying used to identify different bacteria. Two replicates for each strain were inoculated on MH agar pads. After incubating for 4 hours at 37 C, the topography of the bacterial population was measured using white light interferometry. Each topography comprises a two-dimensional array of height data (provided from the interferometer as "absolute height" with respect to a reference in the machine). A 10× objective with a 0.5× zoom with a lateral resolution ~1.6 um/px (roughly 2 cell lengths) was used.

Next, topographic background "noise" was subtracted from the topographic map, leaving the topography of the bacterial population. The agar that the bacterial colony rests on is likely tilted with respect to the x-y plane of the machine. To standardize the topographic map, a plane was fit to the topography of the agar, and that plane was subtracted from the entire topographic map. This approach provides the height data with respect to a flat background, enabling us to focus on the topography of the bacterial population. Along with this subtraction, a laplacian interpolation method was used to fill in any missing data resulting from slopes in the topography that exceed the slope limit of the objective, or other empty pixels (i.e., points in the topographic map with no data). This approach provides continuous data. Interpolation was used to fill <0.1% of the total amount of data.

Figure 2:
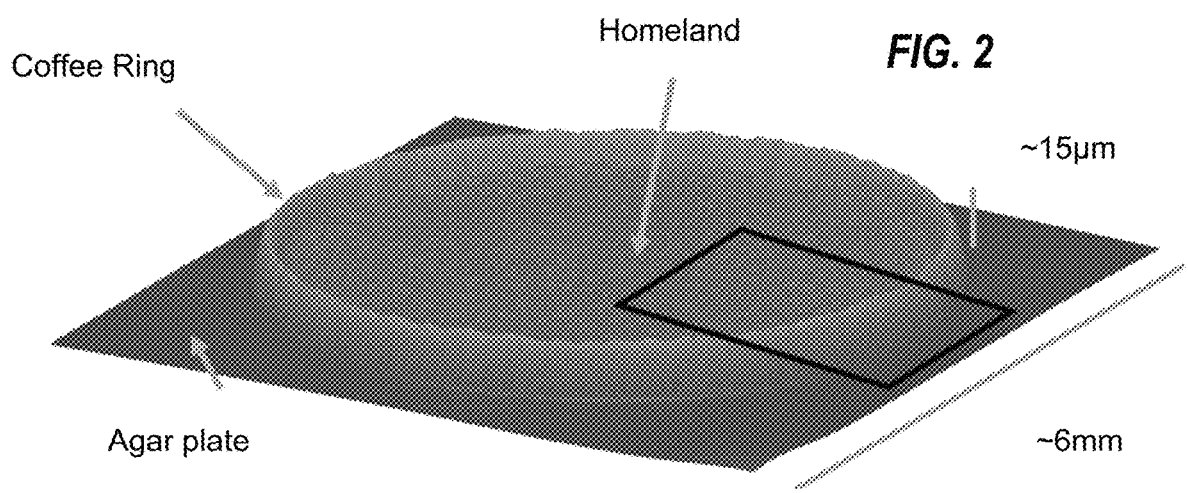
FIG. 2 provides an exemplary topography of a growing colony of bacteria with basic locations identifies, in accordance with some embodiments of the present disclosure.

From the normalized topography (FIG. 2), many biophysically relevant features can be determined. FIG. 2 defines different regions in these topographic maps, which were used to define these features. Among the features used are the median height of the homeland, the variance in height in the homeland, the coefficient of variation of the heights in the homeland, the median height of the coffee ring, the variance of the heights in the coffee ring, the coefficient of variation of the heights in the coffee ring, the width of the coffee ring, the saturation width of the coffee ring (explained below), the Hurst exponent of the coffee ring (explained below), the ratio of the median height in the coffee ring to the median height in the homeland, the product of the median height in the coffee ring and the median height in the homeland, and the average Fast Fourier Transform amplitude for different wavelengths (e.g., 10 microns).

Some of the features were simply the first few moments of the height distributions of the stated region, but some features were more complicated. The saturation width and Hurst exponent were metrics in fluctuation and self-similarity analyses. The saturation width was calculated by binning the heights into bins of different length scales, L, and then calculating the standard deviation within each bin, and then the mean of the standard deviations across all bins. This width was then plotted against the length scale of the bins, L. For most data, the width will saturate for large L, i.e., for many large values of L, the width has the same value; this value defines the saturation width. The Hurst exponent is calculated for widths smaller than the saturation width, using width $\sim L^\alpha$, where $\alpha$ is the Hurst exponent. The ratio and product of heights provides insight to initial cell number density dependence on growth. The Fourier spectrum provides biophysical insight into important length scales of the data.

FIG. 2 provides an exemplary topography of a growing colony of bacteria with basic locations identified. The coffee ring is a physical phenomena that can occur with drying drops of liquid. Flows within the droplet transport the particles to the edge where the droplet is pinned to the surface as it evaporates. Here, the bacteria can get pushed in the flow of fluid and are sent towards the edge of the drying inoculated droplet. This leaves a higher density of cells around the edge of the droplet which we call the coffee ring (from the "coffee ring effect"). The homeland is the entire region inside the coffee ring, but for this analysis, only a section of the entire inoculation may be imaged. The section, roughly defined by the black rectangle, contains parts of the homeland and coffee ring that in general show azimuthal symmetry.

As these features cover dramatically different ranges of possible values, each feature was standardized by subtracting the mean calculated across a large number of samples and scaling by the standard deviation.

Finally, the processed data were ready to assemble a classifier. Three different machine learning algorithms were used to classify the features from the topographies based on their family and genus: unsupervised K-means clustering, support vector machines, and a random forest classifier, all implemented in the sklearn module in python. For the support vector machine, four kernels were used: linear, polynomial, sigmoidal, and a radial basis function. The classifiers were trained on data from all species that are desired to be distinguished. Thus, the classifier could be used to distinguish two species, three species, or more, depending on how it is trained.

Once the classifier was trained, it was used to determine the species of a strain that is not in its training set. As stated above, two colonies were inoculated with each strain. While the classifier could be applied to a single colony make the identification, alternatively, to be considered a valid test, both replicates can be required to agree on a classification. If combining multiple methods, more than half of the number of methods may need to agree on a classification.

FIGS. 3-6 provide some example results with preliminary round of data.

Figure 3:
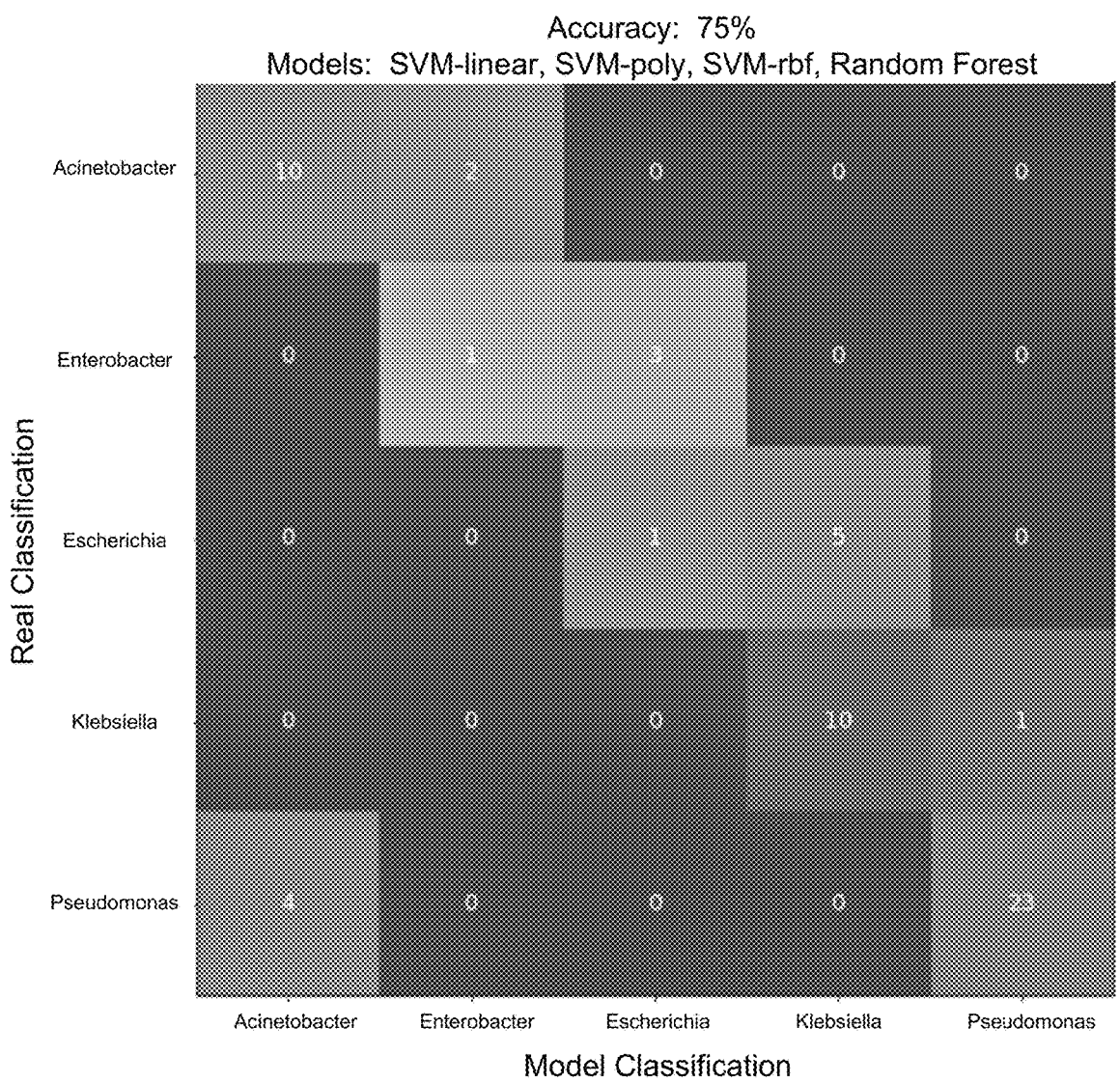
FIG. 3 provides results of utilizing a method to classify bacteria at the genus level, in accordance with some embodiments of the present disclosure.

FIG. 3: Here the method sought to classify bacteria at the genus level. Data from 3 families: *Acinetobacter* (12 strains) are in the Moraxellaceae family; *Enterobacter* (4 strains), *Escherichia* (6 strains), and *Klebsiella* (11 strains) are in the Enterobacteriaceae family (21 total strains); and *Pseudomonas* (27 strains) is in the Pseudomonadaceae family. The vertical axis is the true classification (what genus the data should be classified in) and the horizontal axis is what genus the model agreed upon with two replicates per strain using a combination of 4 machine learning methods as the test—a linear SVM kernel, a polynomial SVM kernel, a radial basis function (rbf) SVM kernel, and a Random Forest algorithm. Each count in the heatmap represents a strain. Here 75% overall accuracy was observed.

Figure 4:
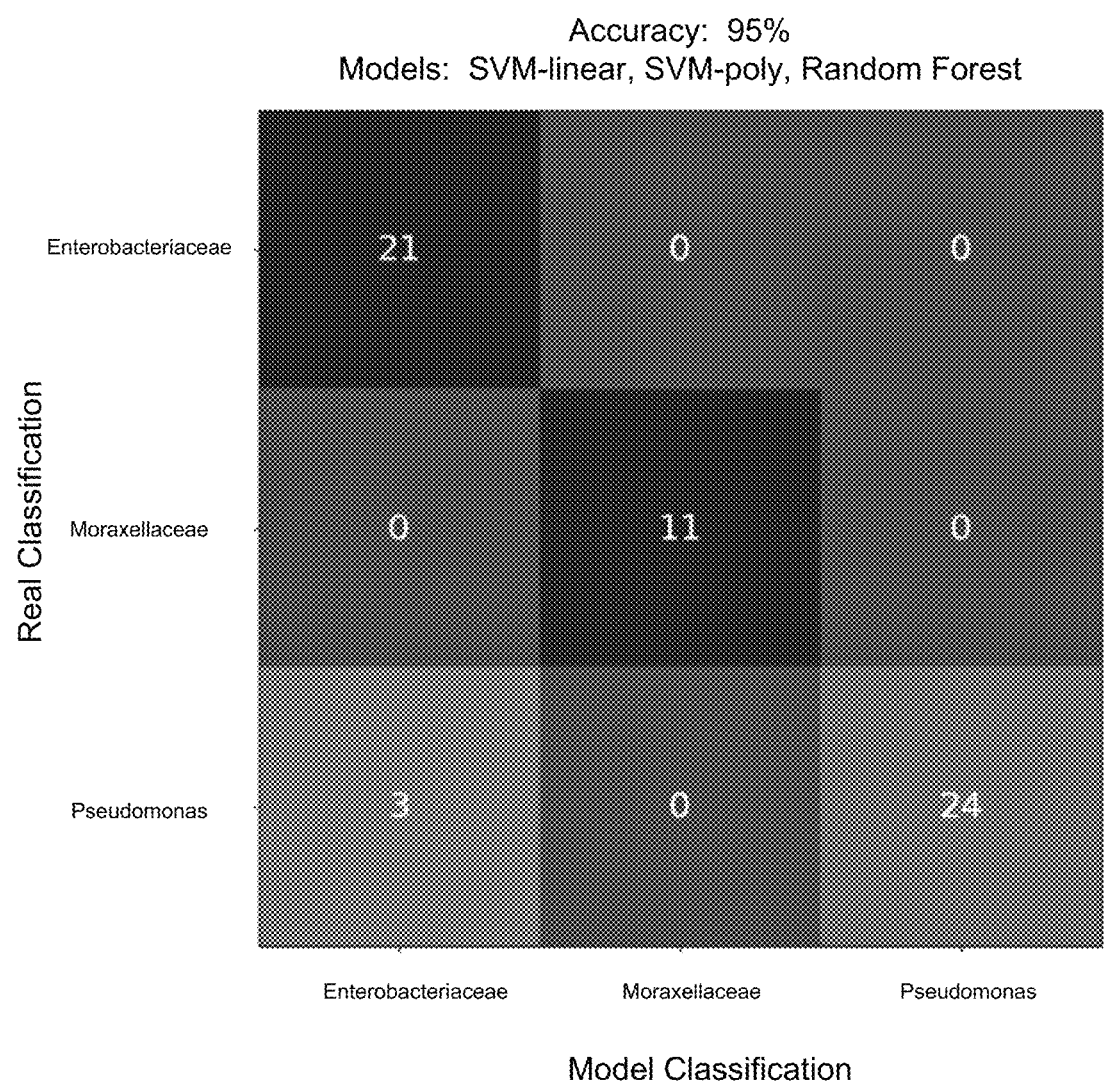
FIG. 4 provides results of utilizing a method to classify bacteria at the family level, in accordance with some embodiments of the present disclosure.

FIG. 4: Here the method sought to classify bacteria at the family level. We had data from 3 families: 21 strains from the Enterobacteriaceae family, 11 strains from the Moraxellaceae family, and 27 strains from the Pseudomonadaceae family. The vertical axis is the true classification (what family the data should be classified in) and the horizontal axis is what genus the model agreed upon with two replicates per strain using a combination of 3 machine learning methods as the test—a linear SVM kernel, a polynomial SVM kernel, and a Random Forest algorithm. Each count in the heatmap represents a strain. Here, 95% overall accuracy including 100% sensitivity for the Moraxellaceae and Enterobacteriaceae families was observed.

Figure 5:
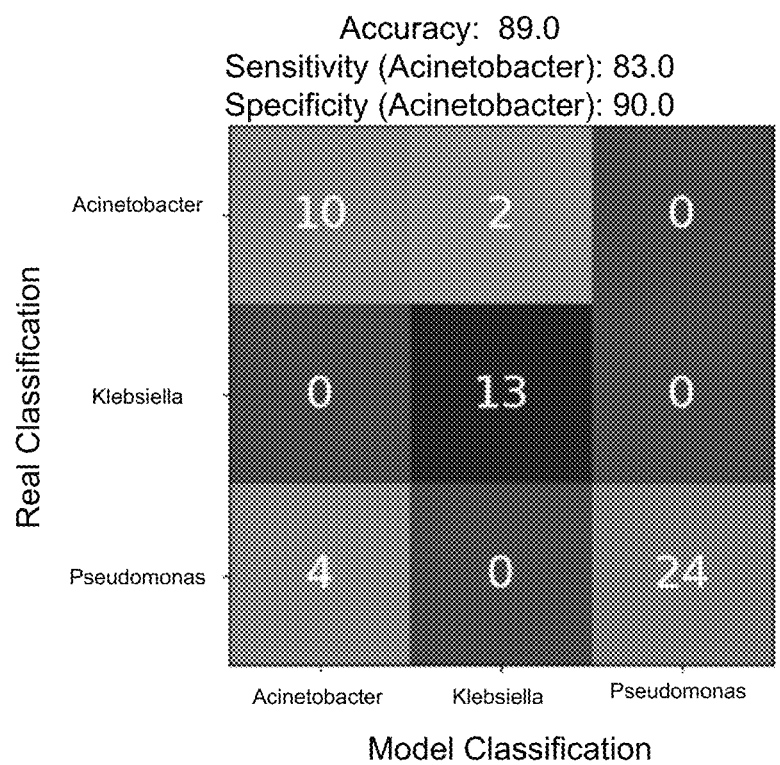
FIG. 5 provides results of utilizing a method to classify bacteria at the genus level, in accordance with some embodiments of the present disclosure.

FIG. 5: Here the work from FIG. 2 was repeated except the genuses with ultra-low numbers of candidates (*Enterobacter* and *Escherichia*) were removed. This was similar also to FIG. 3, but with a smaller sample size for the Enterobacteriaceae family. Here, 89% accuracy was observed.

Figure 6:
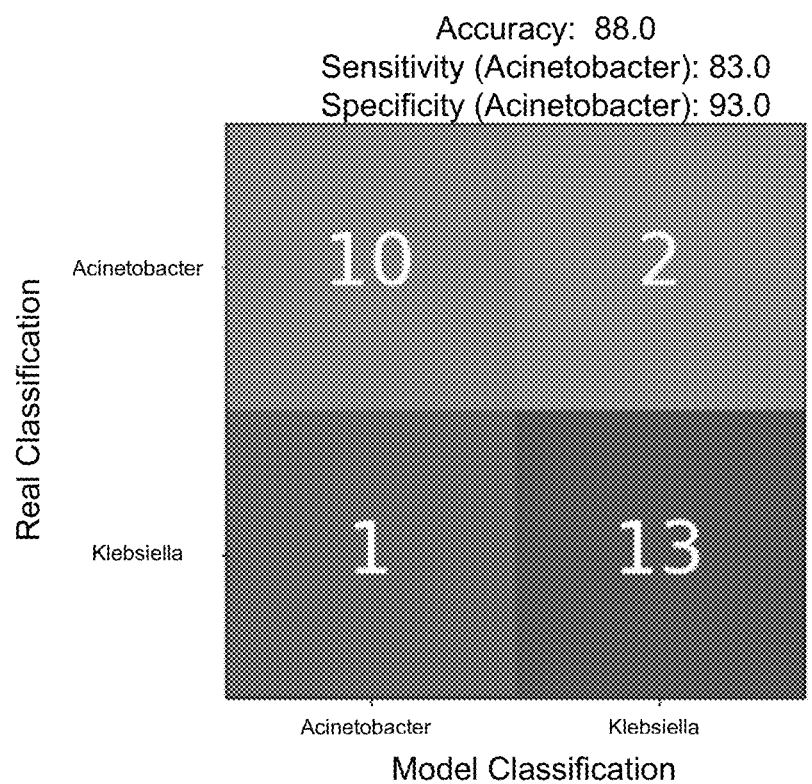
FIG. 6 provides results of utilizing a method to classify bacteria at the genus level, in accordance with some embodiments of the present disclosure.

FIG. 6: Here, in performing the method, the *pseudomonas* from FIG. 4 were removed and tested only the *Acinetobacter* and *Klebsiella* genuses. Overall this is a small sample size with less than 15 samples for each genus, but 88% accuracy between the two genuses was still observed.

As those skilled in the art would understand, the methods (or one or more steps of the methods) disclosed herein can be implemented on a computing device. For example, memory can comprise logical instructions that when implement by one or more processors or combinations of processors can cause the one or more processors to perform one or more of the steps disclosed herein. In some embodiments, the computing device can output data indicative of, for example, the topography or the components identified by the classifier. For example, in some embodiments, data can be outputted to a display to present to a user. In some embodiments, the data can be transmitted to a remote computing device.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:
   imaging at least a portion of a biological specimen to generate data indicative of a topography of at least a portion of the biological specimen; and
   determining, using a computer-implemented computational algorithm, based at least in part on the generated data, whether one or more pathogens are present in the at least a portion of the biological specimen;
   wherein the determining comprises:
   standardizing the generated data; and
   determining, with the standardized data, if one or more biophysically relevant features is present and, if so:
   inputting one or more of the biophysically relevant features into a classifier; and
   determining, with the classifier, an identity of one or more pathogens present in the at least a portion of the biological specimen.

2. The method of claim 1, wherein the biological specimen is selected from a group consisting of: blood, urine, cerebrospinal fluid, saliva, sputum, synovial fluid, pleural fluid, peritoneal fluid, amniotic fluid, semen, vaginal secretions, nasal swabs, throat swabs, tissue biopsies, and stool samples.

3. The method of claim 2, wherein one or more of the pathogens is selected from a group consisting of: bacteria, fungi, parasites, viruses, and combinations thereof.

4. The method of claim 1, wherein the imaging comprises performing profilometry.

5. The method of claim 4, wherein the performing profilometry comprises performing interferometry.

6. The method of claim 5, wherein the performing interferometry comprises performing white light interferometry.

7. The method of claim 6, wherein the performing white light interferometry comprises performing coherence scanning interferometry.

8. The method of claim 1, wherein the standardizing comprises:
   fitting an equation on one of at least a portion of a topography of a substrate on which the biological specimen is inoculated and a topography of the biological specimen; and
   subtracting a surface defined by at least a portion of terms of the fitted equation from an entire topographic map indicated by the data.

9. The method of claim 1, wherein the computer-implemented computational algorithm comprises one or more machine learning algorithms selected from a group consisting of: an unsupervised K-means clustering method; a support vector machines method; and a random forest classifier method.

10. The method of claim 1, wherein the computer-implemented computational algorithm comprises a convolutional neural network.

11. The method of claim 1, wherein the generated data comprises a two-dimensional array of height data.

12. The method of claim 11, wherein the height data corresponds to an absolute height with respect to a reference height.

13. The method of claim 1 further comprising generating an output indicative of the presence and/or identity of one or more of the pathogens.

14. A method of identifying one or more components in a biological material, the method comprising:
   obtaining data indicative of a topography of at least a portion of the biological material; and
   determining, using a computer-implemented computational algorithm, based at least in part on the obtained data, whether one or more pathogens are present in the biological specimen material and, if so, an identify of one or more of the pathogens;
   wherein the determining comprises:
   standardizing the obtained data;

determining, with the standardized data, one or more biophysically relevant features;

inputting one or more of the biophysically relevant features into a classifier; and determining, with the classifier, whether one or more pathogens are present in the biological material and, if so, the identity of one or more of the pathogens.

15. The method of claim 14, wherein a pathogen of one or more of the pathogens is selected from a group consisting of: a species of bacteria; a species of fungi; and a species of parasites.

16. The method of claim 14, wherein the obtaining is selected from a group consisting of performing white light interferometry and performing coherence scanning interferometry.

17. The method of claim 14, wherein the standardizing comprises:

fitting an equation to a topography of a substrate on which the biological material is inoculated; and subtracting a surface defined by the fitted equation from an entire topographic map indicated by the obtained data.

18. A method comprising:

performing profilometry on a portion of a biological specimen;

generating, from the performing, data indicative of a surface topography of the portion of the biological specimen; and determining, using a computer-implemented computational algorithm, based at least in part on generated data, whether one or more pathogens are present in the portion of the biological specimen by:

standardizing the generated data;

determining, with the standardized data, one or more biophysically relevant features;

inputting, into a classifier, the one or more biophysically relevant features;

determining, with the classifier, whether one or more pathogens are present in the biological specimen; and if one or more pathogens are present in the biological specimen, determining, with the classifier, the identity of the one or more pathogens.

19. The method of claim 18, wherein the standardizing comprises:

fitting a plane to a surface topography of a substrate on which the biological specimen is inoculated; and subtracting the plane from an entire surface topographic map indicated by the generated data.

* * * * *